Figure 1:
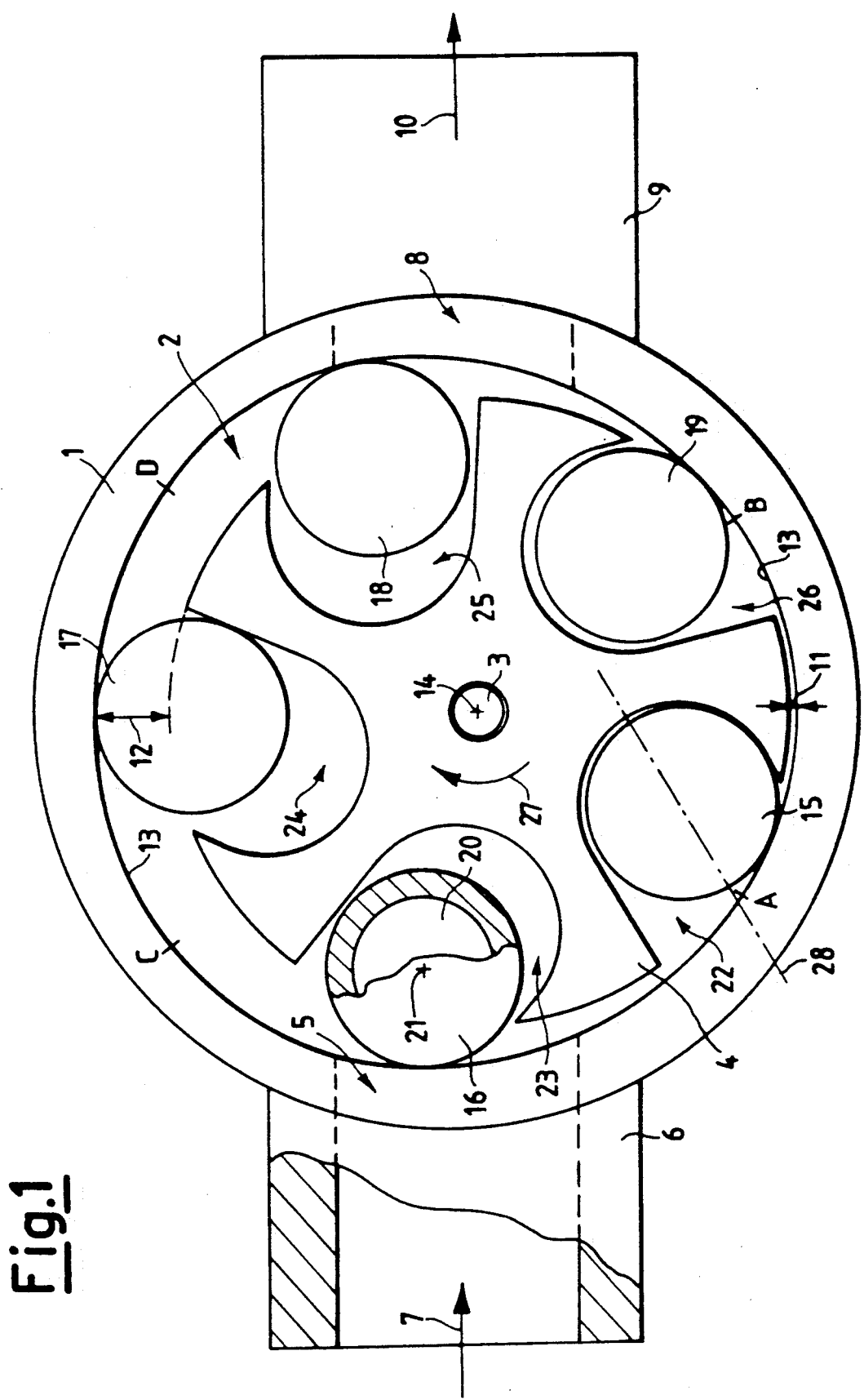

United States Patent [19]
Bergamini et al.

[11] Patent Number: 5,172,593
[45] Date of Patent: Dec. 22, 1992

[54] VOLUMETRIC METER FOR LIQUIDS AND/OR GASES

[75] Inventors: Giorgio Bergamini; Ernesto Paris, both of Bari, Italy

[73] Assignee: Nuovopignone-Industrie Meccaniche & Fonderia SpA, Florence, Italy

[21] Appl. No.: 731,101

[22] Filed: Jul. 15, 1991

[30] Foreign Application Priority Data

Aug. 1, 1990 [IT] Italy ................ 21156 A/90

[51] Int. Cl.⁵ .................................... G01F 3/08
[52] U.S. Cl. ................................... 73/259
[58] Field of Search ................. 73/253, 239

[56] References Cited

U.S. PATENT DOCUMENTS 5,027,654  7/1991  Bergamini .................. 73/259

FOREIGN PATENT DOCUMENTS 2008680  6/1979  United Kingdom .
2109468  6/1983  United Kingdom .
2224079  4/1990  United Kingdom .

Primary Examiner—Herbert Goldstein
Attorney, Agent, or Firm—Morgan & Finnegan

[57] ABSTRACT

A volumetric meter for liquids and/or gases in which rolling rollers are mutually repelled magnetically to press in a sealed manner against the inner surface of the outer casing of the meter, said rollers being housed in circumferential grooves in the rotor, which is mounted eccentric to said outer casing, said grooves being inclined forwards to the direction of rotation of the rotor.

1 Claim, 2 Drawing Sheets

VOLUMETRIC METER FOR LIQUIDS AND/OR GASES

This invention relates to an improved volumetric meter for liquids and/or gases which by reducing the pressure drop between the upstream and downstream sides of the meter for the same drive torque or, likewise, by increasing the drive torque for the same pressure drop, and hence reducing fluid seepage through the inevitable clearances, results in a higher efficiency and operational reliability of the meter and higher measurement accuracy. More specifically, the present invention relates to an improvement in the volumetric meter the subject of our previous U.S. Pat. No. 5,027,654 of Jul. 2, 1991.

The aforesaid patent application relates to a volumetric meter for liquids and/or gases in which radial grooves in the rotor, mounted eccentrically to the outer casing, house rolling rollers which, by undergoing mutual magnetic repulsion by the action of magnets embedded in them with like magnetization in the direction of the roller axes, are urged radially into a sealed state against the inner surface of said outer casing of the meter, the surface of which comprises two surface portions of constant curvatures but with the same centre situated on the rotor axis in the opposing regions of maximum and minimum clearance between the rotor and outer casing, said portions extending through an angle equal to the angular pitch between two successive rollers, i.e. to 360° divided by the number of rollers used.

This known construction has however the drawback that for determined values of the geometrical parameters, such as the roller radius and the minimum and maximum distance between the roller axes and the rotor axis, and also physical parameters such as the coefficient of friction between the materials used for the rotor and rollers, it can be of poor efficiency or indeed non-operational in that, as can be shown analytically and graphically, the drive torque generated by the pressure required to rotate the rotor is reduced to zero.

The object of the present invention is to overcome the said drawback by providing a new volumetric meter for liquids and/or gases which, for equal aforesaid parameters and said pressure drop, enables a higher drive torque to be obtained, with a consequent improvement in the meter efficiency.

This object is substantially attained by inclining forwards to the direction of rotation of the rotor the said circumferential grooves which house said rolling rollers, instead of being radially arranged. Thus the volumetric meter for liquids and/or gases, comprising an outer casing, in the inner cylindrical cavity of which a rotor is eccentrically mounted to form with the inner surface of said chamber of the outer casing in diametrically opposite regions a minimum and a maximum clearance respectively, at which said inner surface comprises two portions of constant curvatures but with a single centre situated on the rotor axis, said portions extending to straddle said opposite regions through an angle equal to the angular pitch between two successive rolling rollers, said rollers being housed in circumferential grooves in said rotor and being urged in the radial direction, by the mutual magnetic repulsion action provided by magnets embedded in them with like magnetization in the direction of the roller axes, into a sealed state against said inner surface of said cylindrical casing of the outer casing of the meter, which comprises an inlet duct and an outlet duct on opposite sides about said minimum clearance, is characterised according to the present invention in that said circumferential grooves for housing said rolling rollers are arranged in the rotor in a manner inclined forwards to the direction of rotation of the rotor.

The invention is described hereinafter with reference to the accompanying drawings, which illustrate a preferred embodiment thereof by way of non-limiting example in that technical and constructional modifications can be made thereto but without leaving the scope of the inventive idea.

Figure 2:
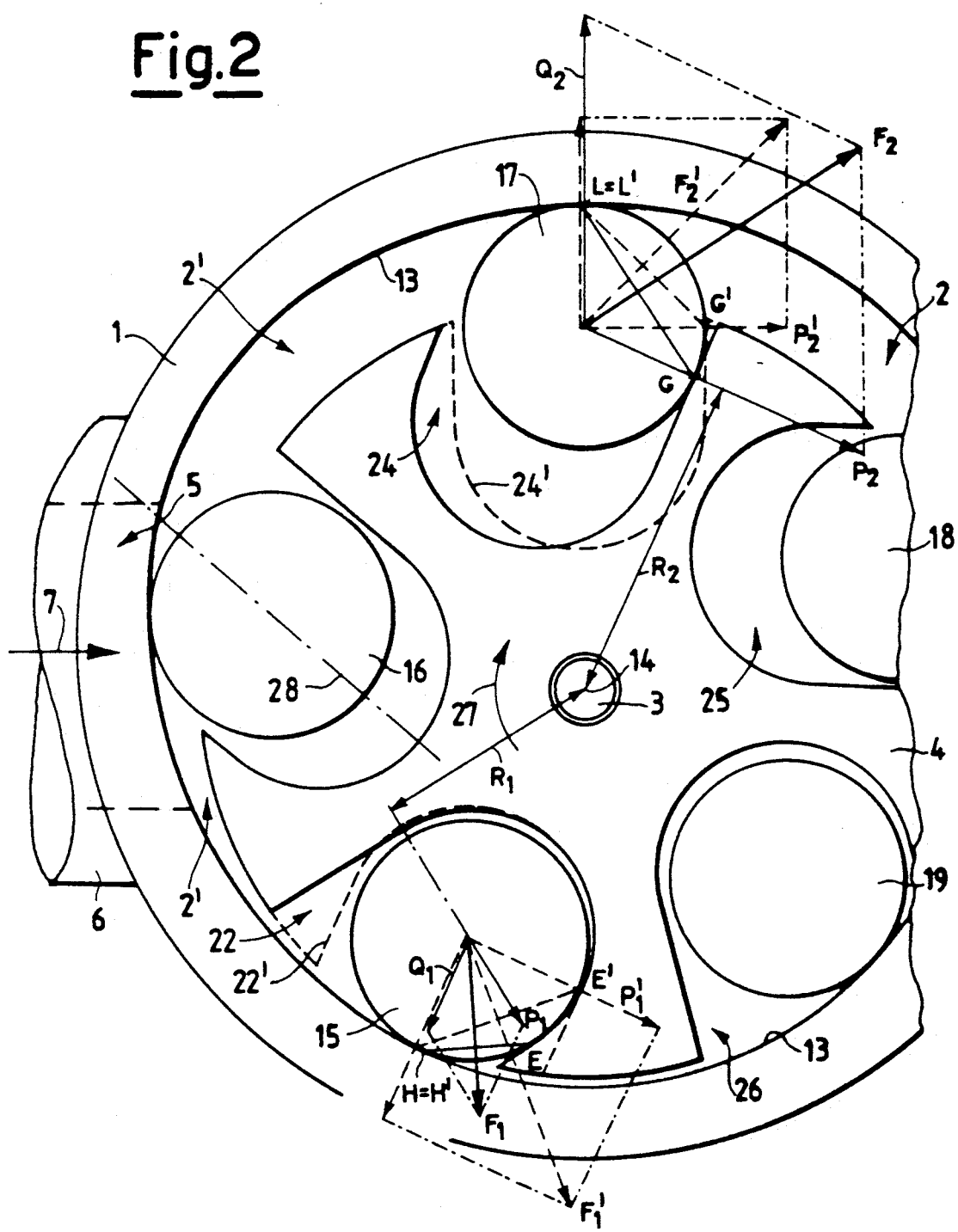

In said drawings:

FIG. 1 is a partly sectional view from above of a volumetric meter for liquids and/or gases in accordance with the invention, from which the cover has been removed;

FIG. 2 is an enlarged partial view of FIG. 1 which graphically illustrates the advantages of the invention over the prior art. In the figures, the reference numeral 1 indicates the outer casing of the meter, in the cylindrical chamber 2 of which the rotor 4 is rotatably mounted by means of the rotation shaft 3. Said casing 1 is also provided with an inlet port 5 connected to the inlet duct 6 for introducing the fluid to be measured in the direction of the arrow 7, and an outlet port 8 connected to the outlet duct 9 for the discharge of said fluid in the direction of the arrow 10. Said rotor 4 is mounted eccentrically within the chamber 2 so that two diametrically opposite regions are created having respectively a minimum clearance 11 and a maximum clearance 12, at which the inner surface 13 of the chamber 2 is formed with two portions AB and CD of constant curvatures but with a single centre on the axis 14 of the rotor 4, which straddle said opposite regions 11 and 12 through an angle equal to approximately the angular pitch between two successive rolling rollers. Said rolling rollers, 15, 16, 17, 18 and 19 respectively, which are urged to seal against said inner surface 13 by the mutual magnetic repulsion action provided by magnets 20 (only one being shown in FIG. 1) embedded in them with like magnetization in the direction of the axis 21 of the rollers, are housed in circumferential grooves 22, 23, 24, 25 and 26 respectively in said rotor 4, said grooves being inclined forwards to the direction of rotation 27 of the rotor 4, along a non-radial axis 28, as is clearly visible in the figures. The method of operation and the advantages of such a meter are explained hereinafter with reference to FIG. 2.

Under the action of the pressure exerted by the fluid 7 entering the portion 2' of the chamber 2, the rollers 15 and 17 are urged to seal against the rotor at the points E and G respectively, and against the inner surface 13 of the chamber 2 of the outer casing 1 at the points H and L respectively, under a force $F_1$ and $F_2$ respectively, which is proportional to the respective segment $\overline{HE}$ and $\overline{GL}$, and perpendicular to it in that, as is well known, said force is determined by the product of the pressure and the area of the rectangle having for its sides the segment $\overline{HE}$ or $\overline{GL}$ and the axial height of the rollers 15 and 17. Resolving said forces $F_1$ and $F_2$ in the directions defined by the roller centre and said points H, E or G, L provides the components, $P_1$ and $P_2$ respectively, which produce a greater torque $P_2R_2$ and a lesser counteracting torque $P_1R_1$. The difference between the two torques is hence the drive torque which rotates the rotor 4 in the direction of the arrow 27. As the other components $Q_1$ and $Q_2$ of the forces $F_1$ and $F_2$ pass through the centre of rotation 14 they determine no torque and are discharged as pressure forces against the inner surface 13 of the chamber 2 of the meter outer casing 1. Repeating the aforegoing analysis if the circumferential grooves 22 and 24 housing the rollers 15 and 17 are not inclined forwards to the direction of rotation 27 of the rotor 4, but instead are arranged radially as indicated by the dashed lines 22' and 24' in FIG. 2, and using the same reference symbols but accentuated, it can be seen that the active segment $\overline{LG}$ is transformed into the smaller segment $\overline{L'G'}$, with the force $F'_2$ obtained being smaller than the preceding force $F_2$, and the force $P'_2$ being consequently smaller than the force $P_2$. In contrast, the segment $\overline{H'E'}$ is larger than the segment $\overline{HE}$, to give a greater force $F'_1$, and a greater component $P'_1$ of said force, to hence create a greater opposing torque.

Thus for equal conditions, inclining the circumferential grooves forwards to the direction of rotation of the rotor results in an increase in drive torque and hence a greater meter efficiency.

We claim:

1. A volumetric meter for fluids, comprising a rotor having an axis of rotation for rotation in a predetermined direction and a plurality of circumferential grooves formed in the surface of said rotor parallel to said rotor axis and angularly offset relative to said rotational axis and inclined in a direction toward said predetermined direction of rotation, an outer casing having an inner cylindrical cavity in which said rotor axis is eccentrically mounted to form with the inner surface of said chamber in diametrically opposite regions a minimum and a maximum clearance between said rotor and said inner surface respectively, and at which said inner casing surface has two portions of constant curvatures but with a single centre situated on said rotor axis, said constant curvatures portions extending to straddle opposite inner surface regions through an angle equal to the angular pitch between two successive of said circumferential rotor grooves, a plurality of rollers, each of said rollers being housed in a respective one of said grooves in said rotor, and a plurality of magnets, each associated with a respective one of said rollers, said individual magnetic fields being oriented to produce mutual magnetic repulsion among said magnets in order to urge said rollers in radial directions by the mutual magnetic repulsion action provided by magnets with like magnetization in the direction of the roller axes thereby to press each of said rollers into a sealed state against said inner surface of said cylindrical casing of the outer casing of the meter.

* * * * *